(12) United States Patent
Liang et al.

(10) Patent No.: US 6,983,655 B2
(45) Date of Patent: Jan. 10, 2006

(54) VEHICLE CESSPOOL LEVER SENSOR

(76) Inventors: Chia-Hung Liang, No. 4-3, Hengkerya, Taishan Hsiang, Taipei County (TW); Chia-Fu Liang, No. 4-3, Hengkerya, Taishan Hsiang, Taipei County (TW)

( * ) Notice: Subject to any disclaimer, the term of this patent is extended or adjusted under 35 U.S.C. 154(b) by 0 days.

(21) Appl. No.: 10/823,755

(22) Filed: Apr. 14, 2004

(65) Prior Publication Data

US 2005/0229701 A1   Oct. 20, 2005

(51) Int. Cl.
   *G01F 23/72*   (2006.01)
(52) U.S. Cl. .......................... 73/313; 73/319
(58) Field of Classification Search .......... 73/313, 73/319
   See application file for complete search history.

(56) References Cited

U.S. PATENT DOCUMENTS 4,480,469 A * 11/1984 Tice ............................ 73/308
5,718,146 A * 2/1998 Liang .......................... 73/319
6,098,457 A * 8/2000 Poole .......................... 73/295
6,185,994 B1 * 2/2001 Liang .......................... 73/116

* cited by examiner

*Primary Examiner*—Hezron Williams
*Assistant Examiner*—Paul M. West
(74) *Attorney, Agent, or Firm*—Rosenberg, Klein & Lee

(57) ABSTRACT

A vehicle cesspool level sensor includes a mounting base, a stainless steel detection tube welded to the bottom side of the mounting base to hold a detection circuit on the inside, an end cap welded to the bottom end of the stainless steel detection tube, a float axially movably mounted the detection tube and movable, the float having two magnets symmetrically disposed at two sides and adapted to induce the detection circuit, a stainless steel strainer fastened with the top end to an endless locating flange at the bottom side of the mounting base, and a strainer cover capped on the bottom end of the stainless steel strainer and fastened to the end cap with a screw.

2 Claims, 5 Drawing Sheets

VEHICLE CESSPOOL LEVER SENSOR

BACKGROUND OF THE INVENTION

1. Field of the Invention

The present invention relates to a level sensor and, more particularly, to a vehicle cesspool level sensor adapted to detect the level of dirty water in the cesspool of a motor vehicle.

2. Description of the Related Art

A conventional vehicle cesspool level sensor, as shown in FIGS. 4 and 5, comprises a mounting base 4, the mounting base 4 having a center mounting hole 41 and an outer thread 42, a strainer 6, the strainer 6 having through holes 611 evenly distributed over the periphery, an inner thread (not shown) provided at the top end and threaded onto the outer thread 42 of the mounting base 4, and an outer thread 61 provided at the bottom end, a perforated bottom cap 62 threaded onto the outer thread 61 of the strainer 6, a detection rod 5 fastened to the center mounting hole 41 of the mounting base 4 with glue and axially suspended inside the strainer 6, the detection rod 5 having a top end fixedly fastened to the center mounting hole 41 of the mounting base 4 and a bottom end capped with an end cap 51, a detection circuit 52 mounted inside the detection rod 5, and a float 53 coupled to the detection rod 5 and movable with the level of the dirty water in the cesspool of the motor vehicle along the detection rod 5, and a magnet 531 fixedly mounted in the float 53 and adapted to induce the detection circuit 52 inside the detection rod 5. The strainer 6 is formed of a plurality of strainer elements that are respectively fastened to one another by a screw joint.

This structure of vehicle cesspool level sensor is still not satisfactory in function because of the following disadvantages.

1. The detection rod 5 is fastened to the center mounting hole 41 of the mounting base 4 with glue to prevent a leakage. However, the glue deteriorates quickly with use. A sever vibration of the motor vehicle may cause the detection rod 5 to loosen from the mounting base 4, resulting in a leakage.

2. The end cap 51 is sealed to the bottom end of the detection rod 5 with glue. However, the glue deteriorates quickly with use, and dirty water tends to leak in the detection rod 5.

3. Because the strainer 6 is molded from plastics, it must have a certain wall thickness to provide the desired strength. However, the through holes 611 in the thick wall of the strainer 6 may easily be blocked with waste matter. It is complicated to clean the strainer 6.

4. In order to firmly secure the strainer elements of the strainer 6 together, a bonding agent is applied to the screw joint between each two strainer elements. After installation, the strainer elements of the strainer 6 are not detachable for washing.

SUMMARY OF THE INVENTION

The present invention has been accomplished under the circumstances in view. It is one object of the present invention to provide a vehicle cesspool level sensor, which is durable in use. It is another object of the present invention to provide a vehicle cesspool level sensor, which is detachable for easy performance of maintenance work.

According to one aspect of the present invention, the vehicle cesspool level sensor comprises a mounting base, a stainless steel detection tube welded to the bottom side of the mounting base to hold a detection circuit on the inside, an end cap welded to the bottom end of the stainless steel detection tube, a float axially movably mounted the detection tube and movable, the float having two magnets symmetrically disposed at two sides and adapted to induce the detection circuit, a stainless steel strainer fastened with the top end to an endless locating flange at the bottom side of the mounting base, and a strainer cover capped on the bottom end of the stainless steel strainer and fastened to the end cap with a screw.

According to another aspect of the present invention, a pipe connector is fastened to an eccentrically disposed through hole of the mounting base for receiving an external water pipe for cleaning the inside of the vehicle cesspool level sensor with running water.

DETAILED DESCRIPTION OF THE PREFERRED EMBODIMENT

Figure 1:
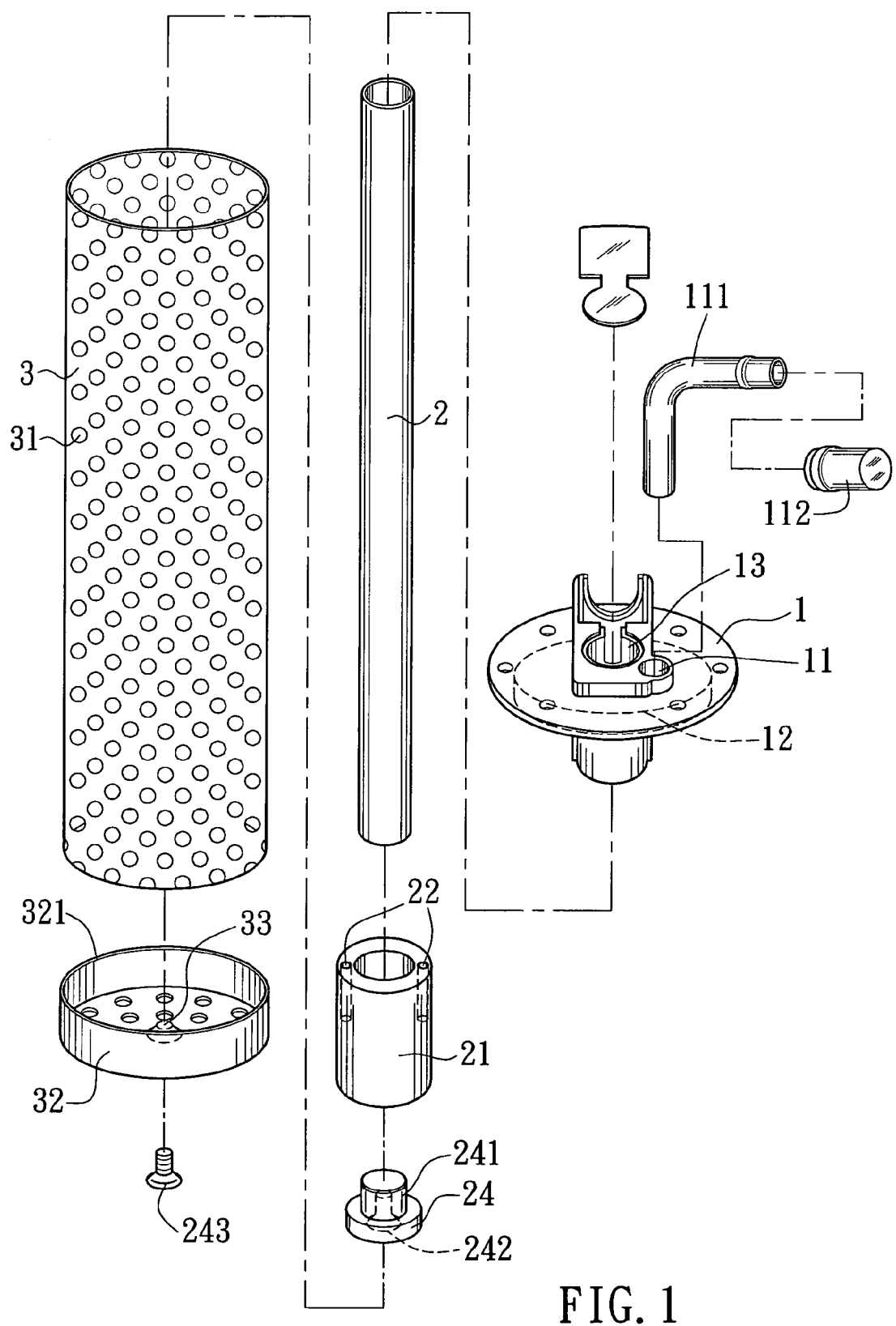
FIG. 1 is an exploded view of a vehicle cesspool level sensor according to the present invention.
Figure 2:
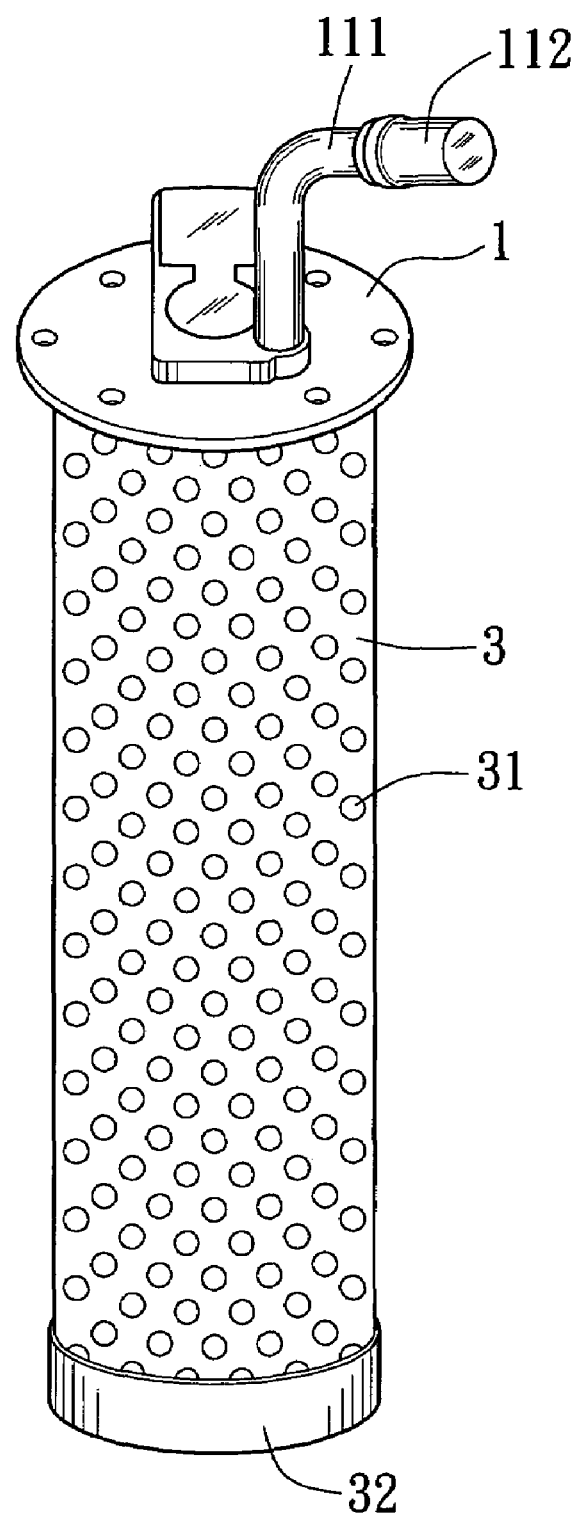
FIG. 2 is an elevational assembly view of the vehicle cesspool level sensor according to the present invention.
Figure 3:
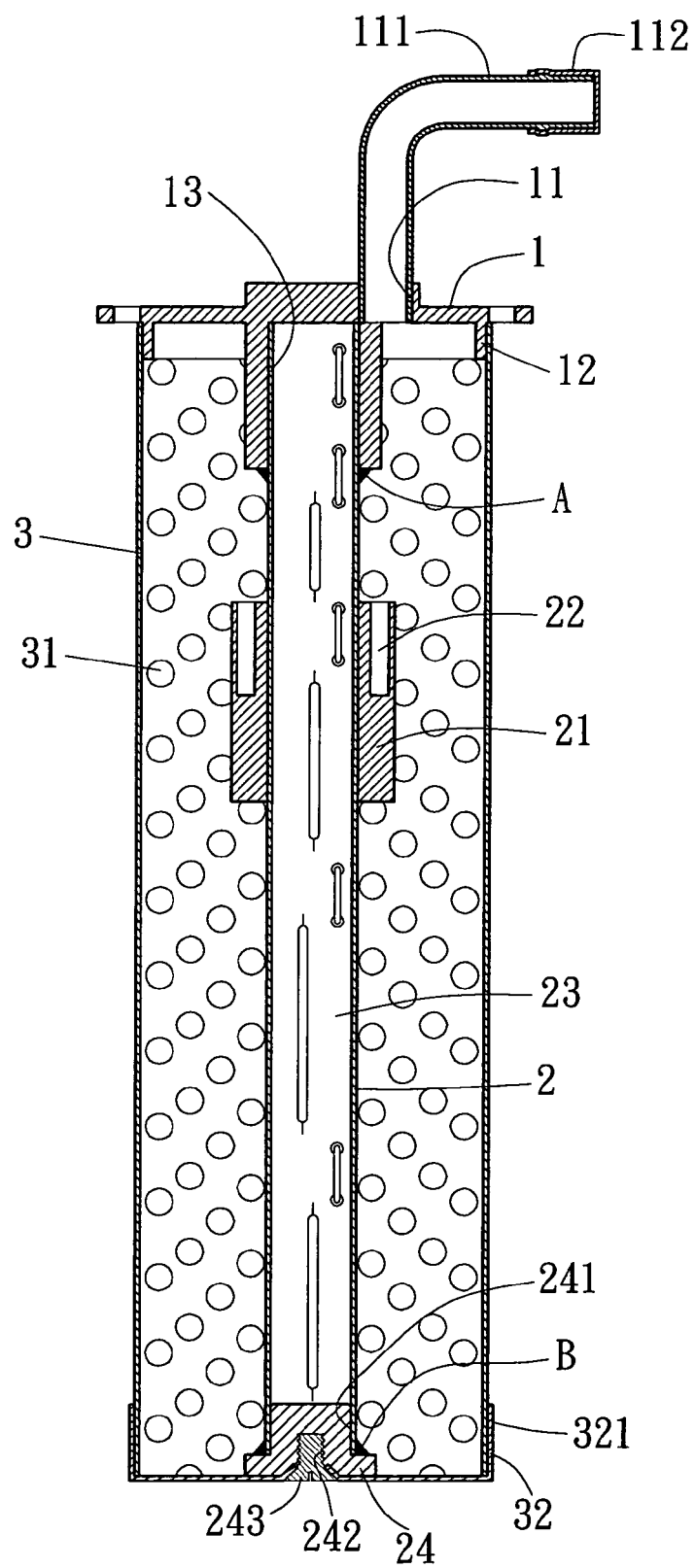
FIG. 3 is a longitudinal view in section of the vehicle cesspool level sensor according to the present invention.
Figure 4:
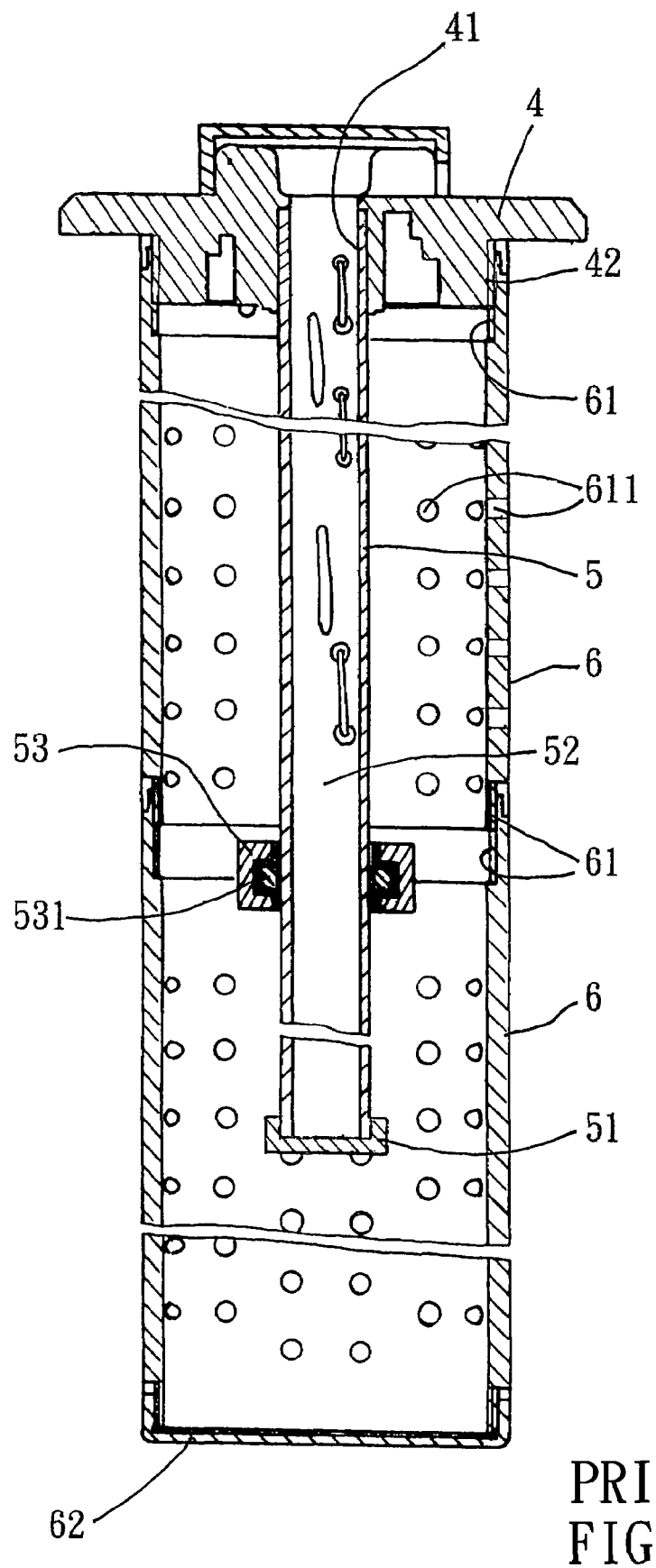
FIG. 4 is a sectional view of a vehicle cesspool level sensor according to the prior art.
Figure 5:
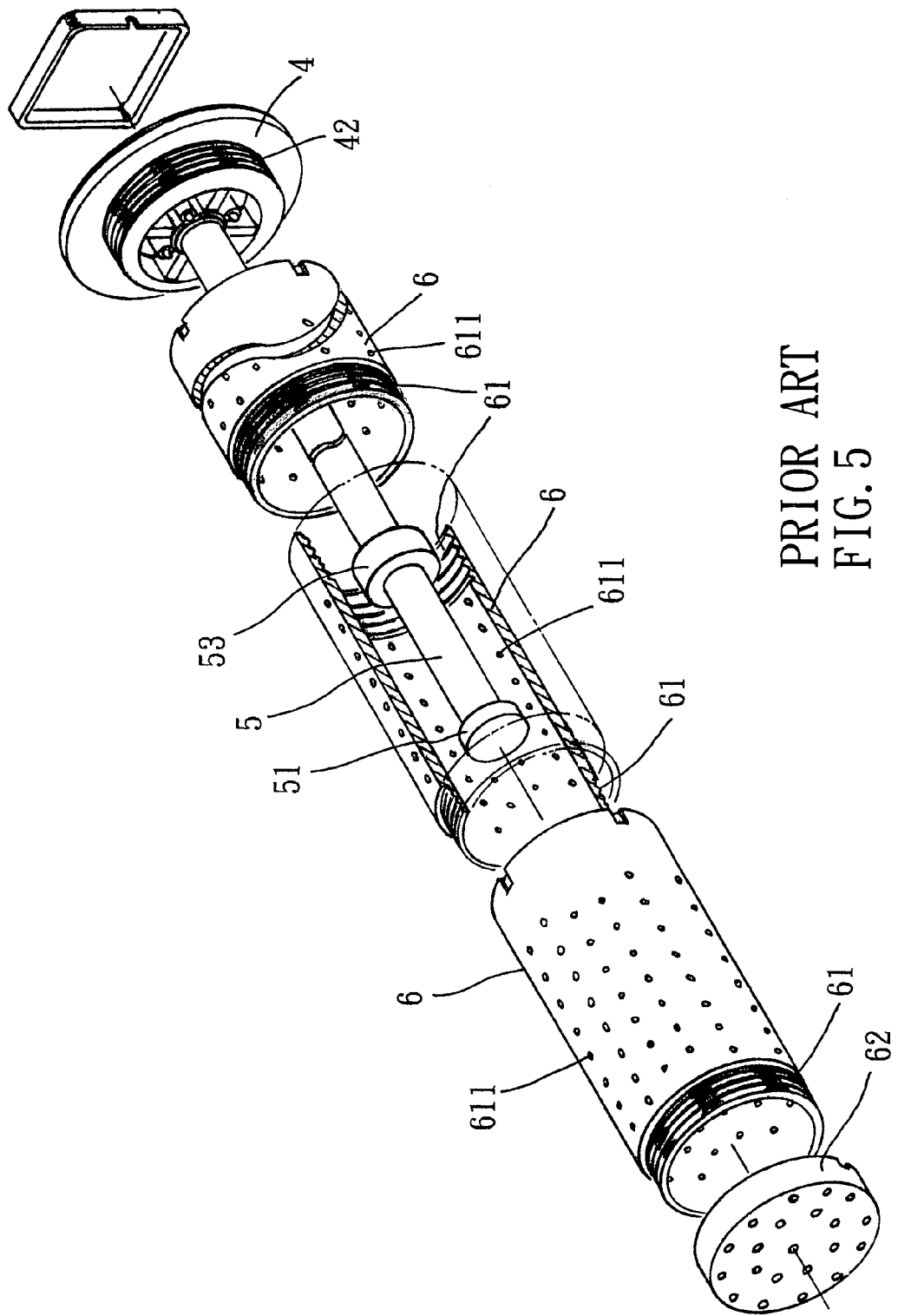
FIG. 5 is an exploded view of the vehicle cesspool level sensor according to the prior art.

Referring to FIGS. 1~3, a mounting base 1, a stainless steel detection tube 2, a float 21, a detection circuit 23, an end cap 24, a stainless steel strainer 3, a strainer cover 32, and a pipe connector 111.

The mounting base 1 comprises a center mounting hole 13, a through hole 11 spaced from the center mounting hole 13 at a distance and extended through the top and bottom walls, and an endless locating flange 12 perpendicularly protruded from the bottom wall.

The stainless steel detection tube 2 has one end, namely, the top end press-fitted into the center mounting hole 13 and then fixedly fastened thereto by welding.

The detection circuit 23 is mounted inside the stainless steel detection tube 2.

The float 21 is a barrel-like floating member sleeved onto the detection tube 2 and movable along the detection tube 2 with the level of the dirty water in the vehicle cesspool in which the mounting base 1 is installed, having two magnets 22 symmetrically disposed at two sides.

The end cap 24 comprises a center stem 241 press-fitted into the bottom end of the stainless steel detection tube 2 and fixedly fastened thereto by welding, and a screw hole 242 at the center of the bottom side. The end cap 24 stops the float 21 from falling out of the detection tube 2.

The stainless steel strainer 3 is fastened with the top end thereof to the endless locating flange 12 of the mounting base 1, having a plurality of through holes 31 evenly distributed over the periphery.

The strainer cover 32 comprises a peripheral flange 321 capped on the bottom end of the stainless steel strainer 3, and a center mounting hole 33 fastened to the screw hole 242 of the end cap 24 with a screw 243.

The pipe connector 111 is fastened to the through hole 11 of the mounting base 1 for receiving a water pipe (not shown) that supplies water to wash the inside of the vehicle cesspool level sensor. Further, a sealing cap 112 is provided for sealing the pipe connector 111.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A vehicle cesspool level sensor comprising:
   a mounting base, said mounting base including a center mounting hole, a through hole extended through top and bottom walls thereof at an eccentric location, and an endless locating flange perpendicularly protruded from the bottom wall;
   a pipe connector fastened to the through hole of said mounting base for receiving an external water pipe;
   a stainless steel detection tube, said stainless steel detection tube having a top end welded to the center mounting hole of said mounting base, and a bottom end;
   a detection circuit mounted inside said stainless steel detection tube;
   an end cap welded to the bottom end of said stainless steel detection tube, said end cap comprising a center stem press-fitted into the bottom end of said stainless steel detection tube;
   a float mounted sleeved on said detection tube and movable along said detection tube between said end cap and said mounting base, said float having two magnets symmetrically disposed at two sides and adapted to induce said detection circuit;
   a stainless steel strainer, said stainless steel strainer having a top end fastened to the endless locating flange of said mounting base, a plurality of through holes evenly distributed over the periphery thereof, and a bottom end; and
   a strainer cover, said strainer cover including a peripheral flange capped on the bottom end of said stainless steel strainer, and a center mounting hole fastened to a screw hole of said end cap with a screw.

2. The vehicle cesspool level sensor as claimed in claim 1, further comprising a sealing cap adapted to seal said pipe connector.

* * * * *